July 20, 1954     R. M. WOYTYCH     2,684,249
TOOLHEAD AND TAPER SHANK ADAPTER
Filed Nov. 30, 1950
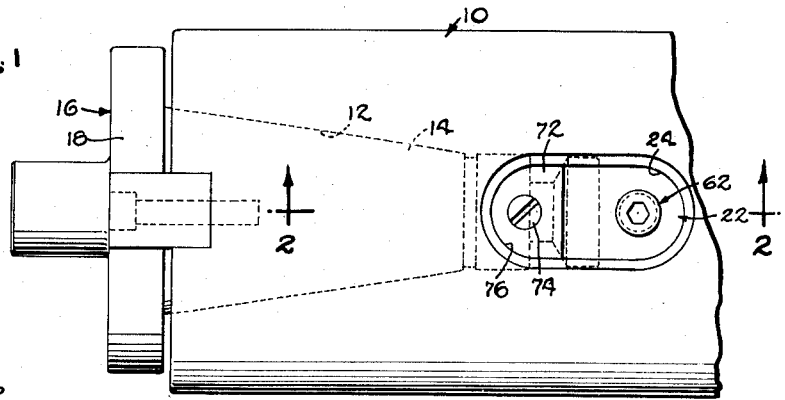
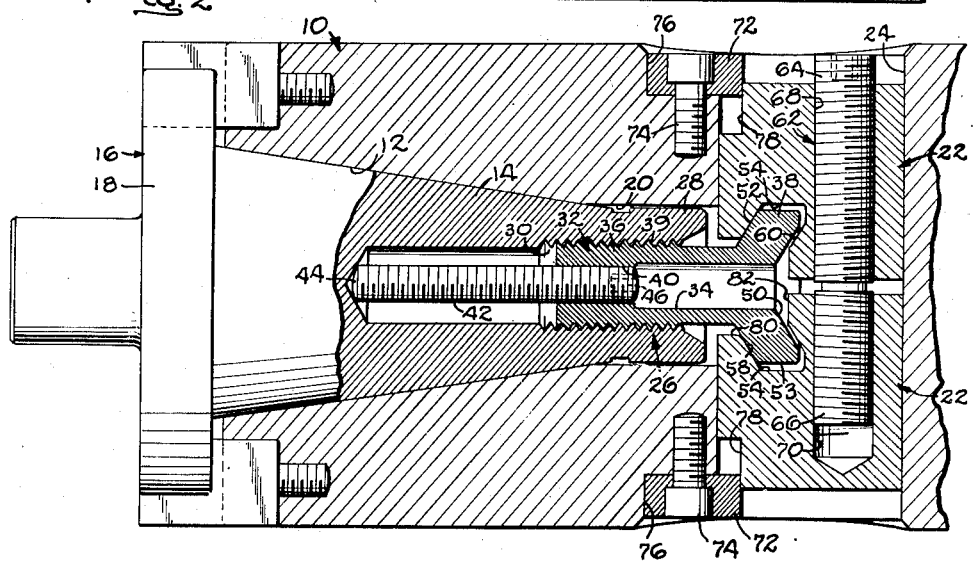
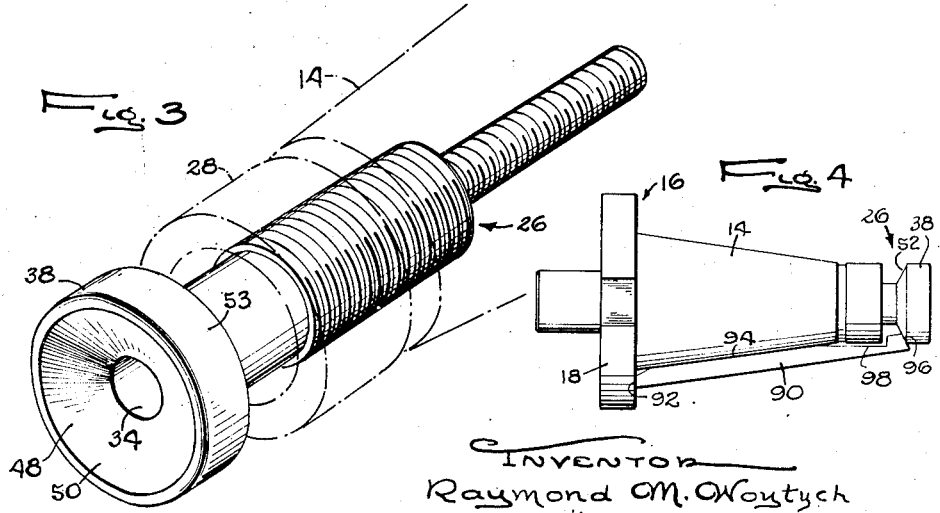
INVENTOR
Raymond M. Woytych
By Carlson, Pitzner, Hubbard & Wolfe
ATTORNEYS Patented July 20, 1954

2,684,249

UNITED STATES PATENT OFFICE 2,684,249

TOOLHEAD AND TAPER SHANK ADAPTER

Raymond M. Woytych, Fond du Lac, Wis., assignor to Giddings & Lewis Machine Tool Company, Fond du Lac, Wis., a corporation of Wisconsin Application November 30, 1950, Serial No. 198,430

12 Claims. (Cl. 279—76)

1

The present invention relates generally to improvements in tool heads, and has particular reference to heads of the type adapted to receive and support therein the taper shank of a removable rotary tool holder.

The tool head comprising the present invention has been designed as an improvement over the tool head shown and described in my prior Patent No. 2,485,799, dated October 25, 1949, and the objects of the present invention are, in general, substantially the same as those ascribed to the invention and development of the patented structure which consists essentially of a tool head having associated therewith a quick-change device for locking the taper shank of a removable tool holder in position.

According to my prior patent, above referred to, the tool head requires, for proper operation thereof, a modification of the conventional taper shank of the tool holder, in order that proper cooperation between the parts of the tool shank and of the tool head may be attained to securely lock the taper shank in operative position. This modification of the taper shank involves one or more machining operations upon the taper shank to adapt the same to the tool holder. The tool head comprising the present invention requires no modification whatsoever of the conventional or standard taper shank of the tool holder, and it is particularly upon this feature that the present invention is predicated.

It is therefore the principal object of the present invention to provide an improved tool holder which is provided with a quick-change device for locking the taper shank of a removable tool holder in position while at the same time requiring no modification whatsoever of the taper shank.

Another object of the invention is to provide a novel taper shank extension or adapter capable of being threadedly received in the end of a standard taper shank, together with a floating cam unit which is associated with the tool head and which is designed for cooperation with the taper shank extension or adapter to removably lock the adapter and taper shank as a whole accurately in centered position.

A further object is to provide, in combination, a taper shank extension and tool head of the character briefly outlined above in which the tool head is provided with a floating cam unit which is reversely operable selectively to tighten and lock the taper shank and adapter in position or to release and partially eject the shank and adapter so as to insure the breaking of

2 any wedge lock between the taper surfaces preparatory to removal of the shank.

Yet another object is to provide an adapter mechanism which is removably attachable to a standard taper shank of a tool holder and by means of which the taper shank is converted for proper cooperation with the improved tool head of the present invention.

A still further object of the invention is to provide such an adapter together with gauging means whereby the adapter may accurately be installed upon a conventional taper shank in exact position for proper cooperation with the improved tool head of the present invention.

Other objects and advantages of the present invention not at this time enumerated will become apparent as the following description ensues.

In the accompanying drawings:

Fig. 1 is a fragmentary side elevational view of a tool head constructed in accordance with the principles of the present invention and showing a taper shank together with an adapter therefor in locking position with respect to the tool head.

Fig. 2 is a sectional view taken substantially along line 2—2 of Fig. 1.

Fig. 3 is a fragmentary perspective view of the locking end of the taper shank showing the adapter applied thereto.

Fig. 4 is a side elevational view of the taper shank and extension comprising the present invention.

Referring now to the drawings in detail, the tool head or quick-change locking assembly, constituting the exemplary embodiment of the invention involves in its general organization a cylindrical body 10, which may constitute, form part of, or be mounted in a rotary machine tool spindle.

In the present instance, the spindle or body 10 is shown as having formed in the outer end thereof a coaxial taper socket 12 adapted to receive and center therein a complemental taper shank 14 of a tool holder 16 having the conventional slotted driving flange 18. The tool holder 16 may be of any desired type adapted to support a rotary cutting tool and is adapted to be operatively connected to the cylindrical body 10 of the tool head in driving relationship when the taper shank 14 is inserted and tightly secured in the taper socket 12. While the taper shank 14 has been shown, for illustrative purposes, as being integrally formed with a tool holder, it will be understood, of course, that the shank may form an integral part of a tool itself such as a milling cutter, a boring bar or the like.

The present invention resides primarily in the provision of a readily accessible and quickly operable locking means for drawing the taper shank 14 of the tool holder 16 tightly into the taper socket 12, and securely clamping it therein, and for positively disengaging the taper surface of the socket and shank when the latter is to be removed from the tool bed. The surface of the socket 12 and shank 14 may be tapered at any desired angle but preferably the taper angle is non-locking in character so that the parts will be self-releasing or at least subject to only a light binding engagement in order to facilitate removal of the tool holder 16 when the locking means is disengaged. The inner end of the taper socket 12 opens into a coaxial cylindrical bore 20 in the tool head body 10. The locking means, in general, comprises one or more, and preferably two wedge cam members 22, disposed and adjustably mounted within the opposite ends of a non-circular slot 24 which may be of rectilinear design and which extends diametrically through the body 10, intersecting the bore 20 so as to communicate intermediate its ends with the inner end of the taper socket 12. The wedge cam members 22 are movable simultaneously transversely of the axis of rotation of the tool head into and out of interlocking engagement with co-acting wedge surfaces provided on the head portion of an adapter element designated in its entirety at 26, the character and function of which will be described presently.

Referring now to Fig. 2, the taper shank 14 of the tool holder 16, in addition to the taper portion thereof, includes a coaxial cylindrical terminal portion 28 which is provided on the small end of the shank and which is adapted to extend with a slight clearance into the bore 20 and which has a diameter not greater than and preferably substantially equal to the minimum diameter of the tapered surface of the shank.

The taper shank 14 is provided with an axially extending socket 30 which is threaded inwardly throughout a portion of its length and which socket is ordinarily provided in conventional taper shanks for the purpose of threadedly receiving therein the usual drawbolt by means of which the taper shank is applied to the tool head body 10. According to the present invention, this conventional threaded socket 30 is employed for the purpose of attachment of the improved adapter 26 to the taper shank 14 and, accordingly, the adapter comprises a tubular member or extension 32 having a longitudinal bore 34 preferably extending completely therethrough. The extension 32 includes a shank portion 36 and an enlarged head portion 38. The shank portion 36 is exteriorly threaded as at 39 and is designed for limited threaded reception within the axial socket 30. The bore 34 of the extension 32 is interiorly threaded as at 40 and this threaded portion of the bore is adapted to threadedly receive therein an elongated locking screw 42 having an end 44 thereof designed for engagement with the bottom or inner-end of the socket 30 provided in the taper shank 14. It will be seen that upon rotation of the extension 32, which may be effected by manual engagement of the head portion 38, the extension 32 may be threaded into and out of the socket 30 to vary the position of the head 36 relative to the end of the taper shank 14 and to thus vary the effective length of the extension 32. When the desired adjustment of the extension 32 has been made, the locking screw 42 may be tightened against the bottom of the socket 30 by insertion of a suitable tool, such as an Allen wrench, or the like, through the bore 34 of the extension 32 and into a non-circular socket 46 provided in the end of the locking screw 42. Means are provided to facilitate accurate adjustment of the position of the extension 32 so as to accommodate the tool head body 10 and will be described subsequently.

Still referring to Fig. 2, the head portion 38 of the extension 32 is provided with a frusto-conical recess 48 in the forward end thereof which communicates with the bore 34 and which provides an accurate conical wedge surface 50 of a concave nature at the forward side of the head 38. The rear side of the head 38 is provided with an accurate conical surface 52 which is of a convex nature, the two conical surfaces 50 and 52 existing in spaced parallel relationship and each of them extending forwardly and radially outwardly with respect to the axis of the taper shank and extension. The peripheral side 53 of the head 38 is of cylindrical configuration.

The plural wedge cam members 22, whatever their number, are symmetrically arranged around the common axis of the body 10 so that upon actuation of the locking means a balanced axial thrust will be imparted to the shank. Each of the wedge cam members 22 is provided with a wedge recess 54 in the inner face thereof. Thus, where two wedge cam members 22 are provided as shown, the members are located in diametrically opposed relationship. Each of the wedge recesses 54 is provided with an arcuate cylindrical bottom surface and with one side surface 58 which is complementary to the convex conical surface 52 of the head 38 and which therefore is of concave configuration. The other side surface 60 of the wedge recess 54 is complementary to the concave conical surface 50 and therefor is convex in its configuration. The concave and convex side surfaces 58, 60 of the wedge recess 54 constitute cam surfaces which are adapted to be co-extensively engaged by the convex and concave rear and forward side cam surfaces 52 and 50 respectively of the head portion 38 of the extension 32 during the locking and unlocking operations respectively as will be set forth more clearly hereinafter.

Means are provided for adjusting the wedge cam members 22 simultaneously either radially inwardly into interlocking engagement with the head 38 of the extension 32, or radially outwardly to release the extension. In the present instance, this means comprises a double-ended adjusting screw 62 having screw elements 64 and 66 of opposite leads and which are designed for threaded engagement respectively with radially disposed and aligned tapped bores 68 and 70 in the respective cam members 22. At least one of the bores, namely bore 68, opens completely through its cam block so that the outer end of the associated screw element 64 is accessible for actuation by means of a suitable tool such as an Allen wrench, or the like, from the exterior of the tool head body 10. The other bore is preferably closed at its outer end. By providing a control for the screw element 64 at only one end thereof, a convenient directional control is attained. Thus the screw element 64 may be always turned in one direction to apply or advance the cam elements 22 and in a counter direction to disengage or retract the cam members.

To limit the outward movement of the cam members 22, suitable rectangular keys 72 are secured by bolts 74 in diametrically opposite recesses 76 formed in the periphery of the body 10. The keys 72 extend from the recesses 76 partially across the outer ends of the slot 24 and into keyways 78 of complemental shape for slidable inter-engagement with the outer ends of the cam members 22.

To insert and lock the taper shank 14 tightly in the taper socket 12, the screw 64 is rotated in such a direction as to retract the cam members 22 to their outermost positions or at least to positions wherein the front faces 80 thereof clear the path of movement of the enlarged head 38 of the extension 32 thereby withdrawing the cam elements a sufficient distance to permit insertion of the head into the slot 24. The taper shank 14 of the tool holder 16 is then inserted by hand into the taper socket 12 until the frusto-conical surfaces of the shank and socket move into close proximity with each other and with the head 38 of the extension 32 projected wholly within the slot 24 so that the forward face of the head bears against a limiting surface 82 provided on each cam member 22. The screw 64 is then rotated in the proper direction to move the cam members 22 inwardly toward their advanced position and consequently toward each other. As a result, the peripheral regions of the head 38 will enter the wedge recesses 54, and through camming engagement between the concave conical side surfaces 58 of the recesses and the convex conical rear side surfaces 52 of the head 38 will draw the head to the right as viewed in Fig. 2 and tighten the taper shank 14 against the wall of the taper socket 12 to positively lock the taper shank in centered position within the taper socket. Since the cam member 22 and the oppositely threaded dual screw element 64 constitute a floating unit, locking pressure will be equally applied to and balanced against the extension head 38 to insure exact axial alignment of the taper shank 14 within the tool body 10.

It is to be noted that the perpendicular distance between the conical side surfaces 58 and 60 of the wedge recesses 54 is slightly in excess of the perpendicular distance between the conical surfaces 52 and 50 representing the rear and front faces respectively of the enlarged head 38 of the adapter extension 32 so as to permit coaction between these former surfaces without interference.

When the taper shank 14 is to be removed, the screw 64 is turned in a direction to retract the cam members 22 to their outer-most positions or at least until the front surfaces 80 clear the cylindrical peripheral side 53 of the enlarged head 38. Upon initial movement of the cam members 22 toward their retracted position, the conical cam surfaces 58 and 52 are disengaged to release the shank 14 and subsequently the cam surfaces 60 and 50 become engaged to force the head 38, and consequently the taper shank 14 to the left as viewed in Fig. 2, thereby insuring separation of the taper surfaces of the shank and socket within which it is mounted in the event that there is any tendency for the shank to adhere to the socket. When clearance is afforded by the inner or front faces 80 of the cam members 22, or when the cam members have been fully retracted against the stop keys 72, the shank 14 may be readily removed from the taper socket 12.

It will be evident that when employing the adapter 26 to enable a standard taper shank such as the taper shank 14 to be applied to the improved tool head, it is essential that the position of the enlarged head 38 of the extension 32 be accurately adjusted so that it will cooperate properly with the wedged recess 54 in the cam elements 22 in the manner previously described. In order to facilitate initial adjustment of the enlarged head 38, a gauge tool 90 (Fig. 4) is provided. This gauge tool is in the form of an accurately machined bar which is preferably rectilinear in cross-section and which is of elongated trapezoidal configuration, having a short end surface 92 designed for engagement with the front surface of the driving flange 18, an elongated side surface 94 designed for co-extensive engagement with the side of the frusto-conical taper shank 14, a short end surface 96 designed for engagement with the convex conical surface 52 of the enlarged head 38 and having a clearance recess 98 designed to accommodate the cylindrical terminal portion 28 of the taper shank 14. In initially adjusting the enlarged head 38 of the extension 32 of the adapter 26, the extension 32 is rotated in the threaded socket 30 until the surfaces 92, 94 and 96 of the gauge bar are brought into flush relationship with the cooperating surfaces of the taper shank and its extension, after which the locking screw 42 may be tightened in the manner previously described to firmly lock the extension 32 in its adjusted position. Once this adjustment has been made it may remain a permanent one insofar as the particular tool head 10 with which it is associated is concerned, and when the taper shank is employed in connection with other tool heads of a similar character, minor adjustments of the extension 32 may or may not be found necessary.

It will be evident that the taper shank 14 may quickly be applied to or removed from the tool head body 10 in the manner set forth in detail above. Since the enlarged head 38 of the extension 32 and the sides of the wedge recesses 54 present complementary co-acting surfaces which are conical in design, no accurate radial adjustment of the taper shank relative to the tool head is required.

I claim:

1. In a machine tool, the combination comprising, a tool head provided with a taper socket in the forward end thereof, a rearwardly tapered tool shank adapted for insertion into said socket, means on the small end of said taper shank in axial alignment therewith providing an annular tapered frusto-conical cam surface, a plurality of uniformly peripherally spaced cam members radially movable in said tool head from retracted positions to advanced positions for wedge camming engagement with said annular surface, and means for advancing the cam members simultaneously to draw the shank axially inwardly of the tool head and tighten and lock said shank in said taper socket, said annular frusto-conical cam surface being adapted for wedge camming engagement with said cam members in all angular positions of said shank.

2. In a machine tool, the combination comprising, a tool head provided with a taper socket in the forward end thereof, a tool holder having a rearwardly tapered shank adapted for insertion into said socket, means on the small end of said taper shank in axial alignment therewith providing an external annular frusto-conical cam surface and an internal annular frusto-conical cam surface tapering in the same direction, a plurality of uniformly peripherally spaced cam members radially movable in said tool head between retracted and advanced positions, each of said members having a pair of annular cam surfaces thereon movable into wedge camming engagement with said external and internal cam surfaces respectively irrespective of the angular position of the shank, and means for advancing and retracting said cam members to draw in and eject the shank relative to the socket, respectively.

3. In a machine tool, the combination comprising a rearwardly tapered tool shank having a threaded axial bore, a tool support having a tapered socket for receiving the shank, an adjustable cam extension member having an externally threaded portion disengageably and adjustably threaded into said bore and adapted to be screwed therealong, said cam extension member having an external annular generally conical cam surface tapering forwardly, and clamping means on the tool support including a plurality of radially movable jaws having respective annular cam surfaces engageable with the cam surface on said extension member, and means for moving the jaws inwardly to draw the shank into the socket.

4. In a machine tool, the combination comprising a tapered tool shank having a threaded axial bore, a tool support having a tapered socket for receiving the shank, a cam attachment having an externally threaded portion disengageably threaded into said bore and adapted to be screwed therealong for axially adjusting said attachment, said attachment having an external annular generally conical cam surface and an internal annular generally conical cam surface tapering in the same direction, a plurality of jaws movable radially in the tool support between advanced and retracted positions, each of said jaws having a pair of cam surfaces engageable with said external and internal cam surfaces respectively regardless of the angular position of said attachment, and means for advancing and retracting the jaws simultaneously to draw in and eject the shank relative to the socket.

5. In a machine tool, the combination comprising a tapered tool shank having a rearwardly opening threaded axial socket, a tool support having a tapered socket for receiving the shank, a cam attachment having a stem threaded into the socket in the shank and a generally conical cam head on the rearward end of the stem, the cam attachment being provided with a threaded axial bore, a lock screw threaded into the bore in the cam attachment for locking engagement with the bottom of the socket in the shank, clamping means on the tool support including a plurality of jaws movable radially into advanced positions, said jaws having respective cam surfaces engageable with said cam head, and means for advancing the jaws simultaneously to draw the shank into locking engagement with the socket.

6. In a tool head for receiving a rearwardly tapered tool shank of the type having a threaded axial bore, the combination comprising a cam attachment having a head and a threaded stem extending forwardly therefrom for threaded reception in the tool shank bore and screw adjustment therealong, said head having an external annular forwardly tapering generally conical cam surface, a tool support having a tapered socket for receiving the tool shank, a plurality of jaws movable radially inwardly in said support into wedge camming engagement with said annular surfaces irrespective of the angular position of said attachment, and means for moving the jaws inwardly simultaneously to draw the shank into locking engagement with said socket.

7. In a tool mounting arrangement for machine tools, the combination comprising a tapered tool shank having a threaded axial bore extending into the shank from the rear end thereof, and a cam attachment having a clamp engaging head and an externally threaded stem disengageably threaded into the bore of the shank and adapted for screw adjustment along said bore, said head being provided with a generally conical wedge cam surface tapering in a direction opposite to the taper of said shank so that said cam attachment will draw said shank rearwardly in response to the application of radially inward clamping thrust to said conical cam surface.

8. In a tool mounting arrangement for machine tools, the combination comprising a rearwardly tapered tool shank having a threaded axial socket extending into its rearward end, a cam attachment having a stem threaded into the socket and a clamp engaging head rigid with the stem, said head having a generally conical annular cam surface, the attachment being provided with an axial threaded bore, and a lock screw threaded into said bore for locking engagement with the bottom of said socket.

9. A clamp engaging attachment for a rearwardly tapered tool shank having a threaded axial bore extending into the shank from its rearward end, comprising, in combination, a body having a clamp engaging head and an externally threaded stem extending forwardly therefrom for disengageable and axially adjustable reception in the bore in the shank, said head having an annular generally conical cam surface tapering forwardly so that said attachment will draw the shank rearwardly in response to the application of radially inward clamping thrust to said cam surface, and means for locking said stem in an adjusted position in the bore.

10. A clamp engaging attachment for a rearwardly tapered tool shank having a threaded axial bore extending into the shank from its rear end, comprising, in combination, an externally disengageable and axially adjustable threaded stem for threaded reception in the bore in the shank, said attachment being adapted to be screwed along the bore, and a clamp engaging head on the stem having a pair of generally conical camming surfaces tapering toward the stem, one of said surfaces being external and the other internal so that radial thrust applied in opposite directions to said respective surfaces will move the shank rearwardly and forwardly.

11. A clamp engaging attachment for a tapered tool shank having a threaded axial socket in its small end, comprising, in combination, a body having a forward externally threaded stem portion for threaded reception in the socket, said body having a rearward clamp engaging head portion provided with a tapered annular wedge cam surface, said body being provided with a threaded axial bore, and a lock screw threaded into the bore for locking engagement with the bottom of the socket in the shank.

12. A clamp engaging attachment for a tool shank of the type having a rearwardly tapering outer surface and a threaded axial socket extending into the shank from its rear end and terminating in a bottom surface, comprising, in combination, a body including a front end portion in the form of a stem with external threads adapted to be threaded into the bore in the shank, and a rear end portion in the form of a clamp engaging head having a pair of generally conical annular wedge cam surfaces coaxial with the stem and tapering forwardly, one of said surfaces being external and the other internal, said body having an axial threaded bore, and a lock screw threadedly received in the bore for locking engagement with the bottom surface of the socket in the tool shank.

References Cited in the file of this patent

UNITED STATES PATENTS

| Number | Name | Date |
|---|---|---|
| 1,166,408 | Blood | Dec. 28, 1915 |
| 1,298,196 | Gairing | Mar. 25, 1919 |
| 1,436,573 | Choppinet et al. | Nov. 21, 1922 |
| 1,802,053 | Halborg | Apr. 21, 1931 |
| 1,958,817 | Gase | May 15, 1934 |
| 2,338,989 | Welte | Jan. 11, 1944 |
| 2,485,799 | Woytych | Oct. 25, 1949 |